UNITED STATES PATENT OFFICE.

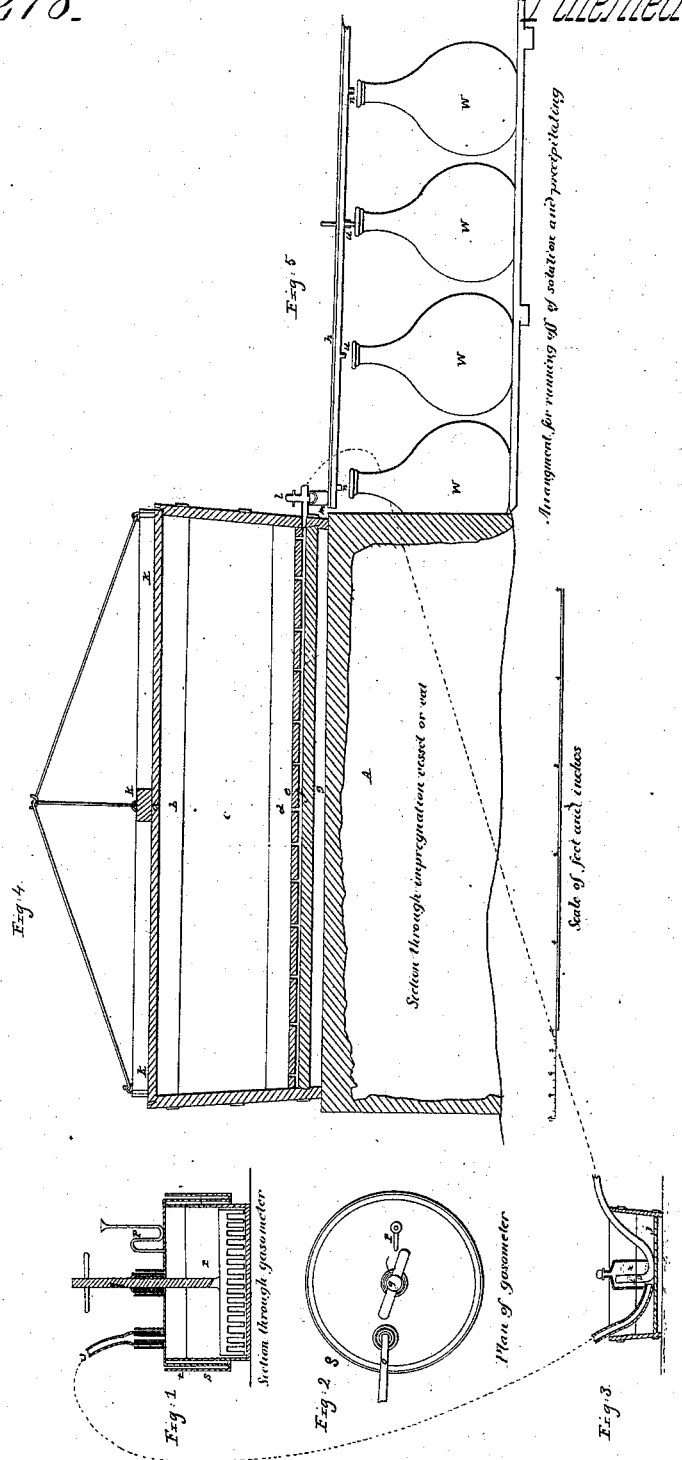

GUSTAVUS F. DEETKEN, OF NEVADA, CALIFORNIA.

IMPROVED APPARATUS FOR EXTRACTING GOLD FROM PYRITES.

Specification forming part of Letters Patent No. 37,278, dated January 6, 1863.

*To all whom it may concern:*

Be it known that I, GUSTAVUS F. DEETKEN, of the city and county of Nevada, in the State of California, have invented a series of new and Improved Apparatus for the Extraction of Gold from Pyrites; and I do hereby declare that the following is a full and exact description thereof, reference being had to the accompanying drawings, and to the letters of reference marked thereon.

Figure 1 presents a sectional view of the gasometer; Fig. 2, a top view of the same; Fig. 3, a sectional view of the apparatus for freeing the chlorine gas of hydrochloric acid. Fig. 4 exhibits a vat of six feet ten inches in diameter by two feet in height. Fig. 5 shows a trough for conveying the solution of chlorides into the carboys.

The nature of my invention consists in providing one or more vats of the size and dimentions as represented in Fig. 4, mounted upon a frame or scaffold of wood, allowing the same to incline slightly toward the side of the vat where the faucet $l$ is seen. Into this vat I introduce the pyrites, which are previously roasted, after which I apply chlorine gas, as generated in the apparatuses marked, respectively, Figs. 1 and 3, conveying the same through leaden pipes to the faucet $l$, penetrating the vat from the bottom side—that is, upward. This gas is allowed to remain in that condition for a few days, or as the case may require, or until the whole mass of the pyrites contained in the vat shall have been completely impregnated with this chlorine gas. When this is accomplished, the gas is allowed to escape by uncovering the vat, water is poured into the vat, which filters through the mass, passing through the faucet $l$ as a solution of various chlorides, whence it is received in the carboys, and there the solution is precipitated.

To enable others skilled in the art to make and use my invention, I will proceed to describe its construction and operation.

I construct a cylindrical casting of lead, from eighteen to thirty inches diamerter, of about twelve inches in depth, the sides of which are about one-quarter of an inch in thickness. This vessel is also provided with another concentric vessel marked $s$, for the purpose of creating a "water-joint." The lid or cover is also cast of lead, provided with a flange or rim, $t$, fitting into the outer vessel, $s$.

$p$ is a siphon-funnel for introducing acid.

$o$ is a leaden discharge-pipe for the generated gas, similarly provided with water-joint concentric cups.

$q$ is a cylinder of lead, at the lower extremity of which a rake is attached for the purpose of stirring the ingredients employed in creating the gas, and is also provided with a water-joint in concentric cups.

For a complete description of the *modus operandi* of chlorine gas we refer to Ure's dictionary, page 410, volume I, edition of 1856.

Fig. 3 represents a wooden tub about sixteen inches diameter by six inches in depth, filled with pure water to about half of its height, $o$ being the pipe for conveying the gas, as it is generated, into the water immediately under the bottle $x$. The pipe B carries off the gas to the impregnating-vat through the faucet-aperture $l$, Fig. 4. The bottle $x$ is a common acid-bottle deprived of its bottom, and, as seen in Fig. 3, rests upon the pipes.

The particular improvements in this apparatus are by far the simplest, economical, and most practicable when compared with the process as applied by Woulfe, which consists of a number of necks to an earthen or glass vessel, as described in most chemical publications.

The tub which I employ contains at all times sufficient water for cleansing the gas of the hydrochloric acid. The facility with which it can be connected and disconnected, as is often required—if, for instance, the pipes should fill with water, or when the pressure of gas should increase from various causes—has proved itself most effectually in my experiments.

In the course of freeing the chlorine gas of the hydrochloric acid, it is found that sulphurous acid, as it is generated, is not consumed by the water, in which case the neck and stopper of the bottle $x$ serve as an egress for the same, if such should be necessary. The sulphurous acid is easily converted into sulphuric acid in the presence of chlorine, and may thereby become essentially deleterious to the impregnating process, forming sulphureted hydrogen with the sulphurets or sulphides which may be present in the vat, Fig. 4.

Fig. 4 presents a large circular wooden vat, (mounted upon a suitable scaffold,) which is coated on its inside with a composition of rosin and tar, and may be made of the size and dimensions stated, tapering toward the bottom. About one inch from the bottom I place a false bottom, *e*, which is perforated with a number of holes for admitting, in the first place, the chlorine gas to the pyrites; secondly, for the egress of the solution of the chlorides.

*d* represents a layer of gravel, coarsest at bottom and finest at the top, to effect a clear solution.

*c* shows a layer of ore or sulphurets (pyrites)—say from two to three tons, according to the size of the vat. *b* is a vacant space.

*a* is the lid or cover, and let into a recess or shoulder inside of the staves of the vat. When gas has been introduced into the vat, the seam or joint of this cover is closed with dough, to prevent the escape of gas.

*k* are ties to guard the cover from warping. The same may be hoisted by a tackle.

*m* is a small trough for conveying the solution from the faucet *l* to the distributing-trough *h i*. The leaden trough *i* is supported by a corresponding wooden trough, *h*, of a semi-circular surface, having a number of pipes situated equidistant, *u*, (about eighteen inches,) provided with stoppers of suitable material. To each of these pipes *u* a carboy, *w*, is placed underneath for receiving the chlorides.

I do not claim the application of chlorine gas for the working of pyrites, nor do I claim the manner of preparing the same; but What I do claim as my invention, and for which I desire to secure Letters Patent, is—

The combination of the several devices and apparatus herein described, and operating substantially as illustrated and explained.

G. F. DEETKEN.

Witnesses:
  J. SILVERSMITH,
  C. H. PIERCE.